June 4, 1929.  A. BRICUGLIO  1,716,106
AUTOMOBILE FENDER
Filed Feb. 12, 1929  2 Sheets-Sheet 1

INVENTOR.
Alfred Bricuglio
BY Gardner W. Pearson
ATTORNEY.

June 4, 1929.  A. BRICUGLIO  1,716,106
AUTOMOBILE FENDER
Filed Feb. 12, 1929  2 Sheets-Sheet 2
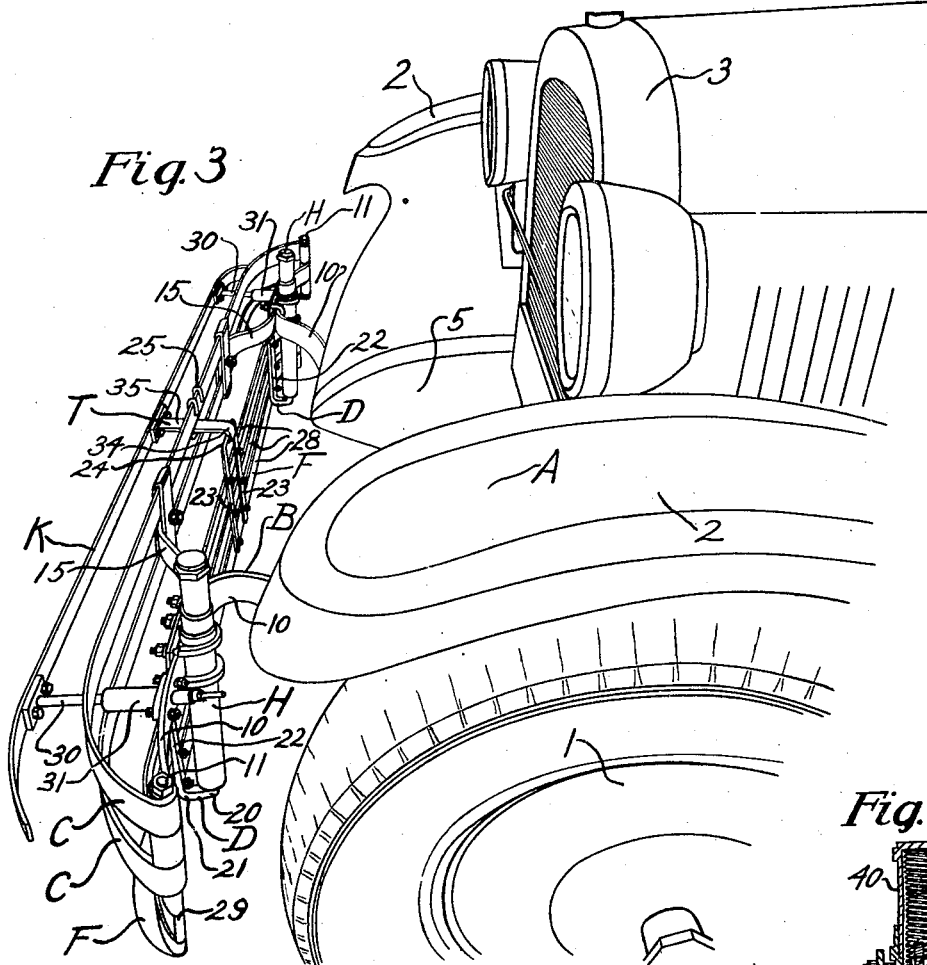
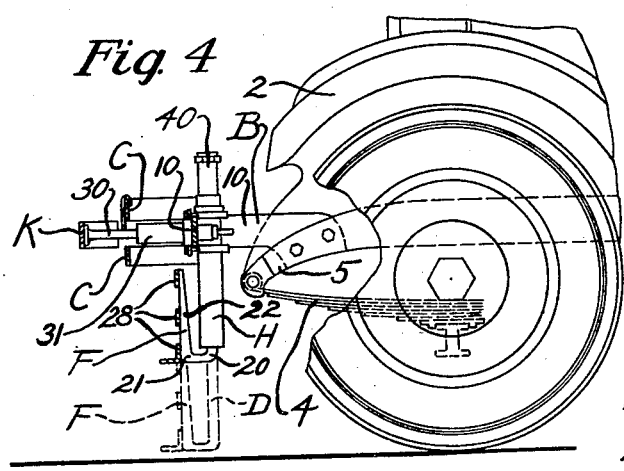
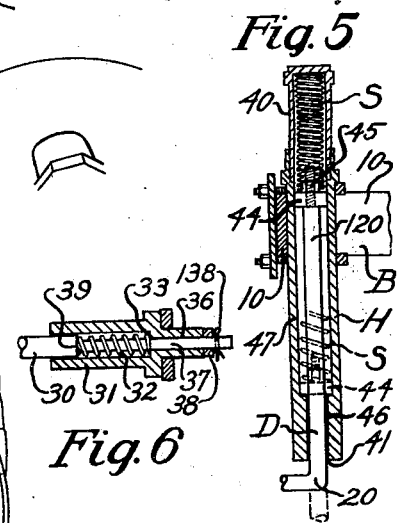
INVENTOR.
Alfred Bricuglio
BY Gardner A. Pearson
ATTORNEY.

Patented June 4, 1929.

1,716,106

UNITED STATES PATENT OFFICE.

ALFRED BRICUGLIO, OF LAWRENCE, MASSACHUSETTS.

AUTOMOBILE FENDER.

Application filed February 12, 1929. Serial No. 339,381.

This invention relates to automobile fenders of the type which are used on the front of automobiles for the purpose of preventing injury to the car in case of a head-on collision. It is an attachment for the regular or fixed fender for the purpose of providing an emergency fender which ordinarily is held up away from the ground, preferably in the space behind the fixed fender, but which will shoot down practically to the ground in case the automobile runs into any person or thing.

The emergency fender is preferably formed of a horizontal frame or horizontal bars carried below and preferably behind the regular fender, by spring pressed arms, and this emergency fender is held up ordinarily by trip mechanism including a trigger and a trigger bar which extends out in front in position to be struck or to strike any object, particularly a person. When, for instance, a person is struck by this bar, the trigger is released and the emergency fender is shot down by the springs and as the automobile continues to travel, such person is picked up or pushed along without serious injury.

My device is attractive in appearance and preferably looks like a downward extension of the main fender but is behind and preferably somewhat below the main or fixed fender, so that if a tree or another machine is struck, the emergency fender is not damaged nor bent.

My springs and arms are carefully housed to protect them from dirt and have long bearings so that they will not jam if any person or thing strikes them at a slant.

The parts are all easily reset and are so arranged that when a person is struck, the emergency fender shoots almost to the ground. If it strikes the ground or any other object, it can move up so that no damage is done.

My device is simple, strong and ornamental. It is easily reset and its parts will not jam after a collision.

In the drawings, Fig. 1 is a front elevation of an automobile with my emergency fender attached, and shown in the up position.

Fig. 3 is a perspective showing the front of an automobile with the fixed fender and with my emergency fender held up in the running position.

Fig. 4 is a side elevation partly in section of the housings together with the fixed and emergency fenders.

Fig. 5 is a vertical section of one of my piston bars and its housing.

Fig. 6 is a sectional detail of the trigger bar holding rod housings.

Figure 1:
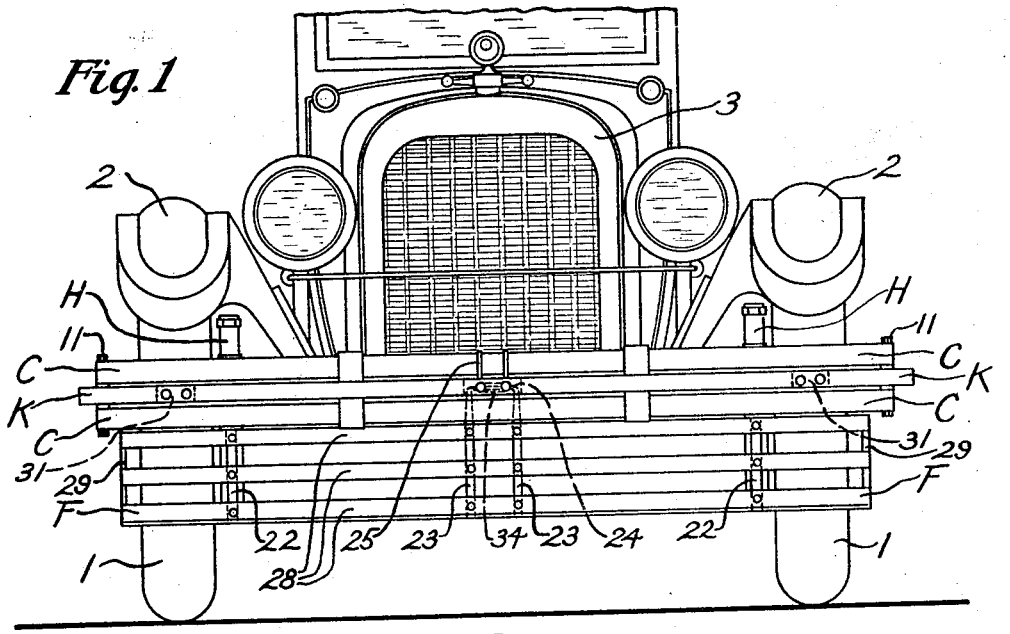
Figure 2:
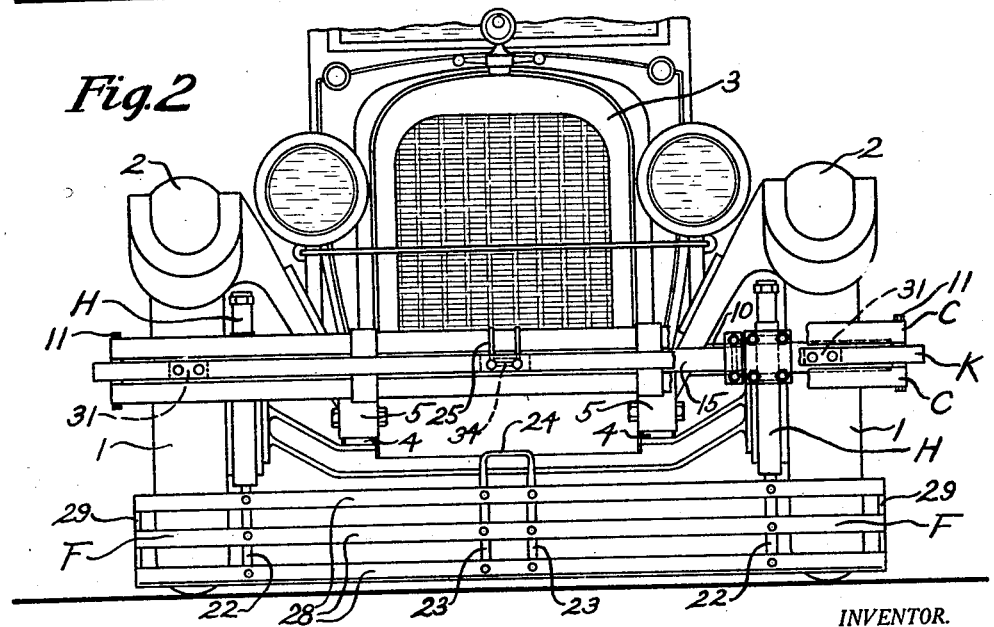
Fig. 2 is a front elevation similar to Fig. 1 showing my emergency fender shot down.

In the drawings, A represents a motor vehicle having the usual front wheels 1, 1 with the mud-guards 2, 2, radiator 3, and springs 4, 4 and projecting chassis frame 5, 5.

B indicates the fixed fender as a whole and comprises the bent arms or brackets 10, 10 each of which is bent outwardly. The parallel horizontal bars C, C, form part of fender B and preferably are attached at each end to an end of an arm 10 by a pivot pin 11 and to another part by an auxiliary arm 15.

Also attached to the arms 10, 10 are the vertically positioned spring holders H, H, each of which is closed at the top by an adjusting nut 40 and is open at the bottom 41.

Each adjusting nut 40 has a long hollow shank to receive the spring S and the end of piston member 120 and the force of spring S can be varied by screwing it in or out.

Vertically slidable in each spring holder H is an emergency fender arm D which extends down therefrom and is bent around at 20, and thence upwardly at 21 below and behind fixed fender B, where each is fastened as at 22 to the emergency fender F. As shown, fender F comprises three parallel bars 28, 28, 28 fastened together at the ends 29 as well as at 22 and extends at each end outside the front wheels.

This emergency fender F, also as shown, includes a handle loop comprising the parallel uprights 23, 23 connected by a bar 24 which serves as a handle and also as a latch whereby the emergency fender is held up by means of the trigger T against the downward pressure of the compression springs S, S.

Each compression spring S, bears against the closed top 40 of each spring holder H, H and at its bottom gears against a piston-shaped washer 44 held by a nut 45 screwed on the inside piston member 120 of each arm D.

These piston washers 44, 44 each fits with a smooth running fit the large cylinder bore 47 of the barrel of each holder H while the piston member 120 of each arm D fits with a similar fit, the elongated, smaller cylinder bore 46. The parts 120, 47 and 46 are all made long enough so that each arm will be guided firmly and accurately and both springs S, S are of such strength and winding that they will shoot the arms D, D and emergency fender F down from the full position to the dotted line position in Fig. 4 when trigger T is released.

The expanded positions of springs S, washer 44 and arm D are shown in the dotted lines in Fig. 5.

When an object such as a person is struck, the bar K is struck first and this forces back the trigger 35 and hook 34 which releases loop 24 allowing the springs S to shoot down the emergency fender quickly enough to prevent a person struck from going under the machine or under the wheels. If a tree or other rigid object is struck, the bar K is forced back against the fixed fender C which takes up the blow and ordinarily neither bar K nor the emergency fender is injured.

The trip mechanism includes a trigger bar K positioned in front of the fixed fender C and carried by rods 30, 30 each of which extends into and through a housing 31 of tubular form. Each rod 30 is normally held out by a spring 32 between the base 33 of housing 31 and a shoulder 39 on the rod.

Each trigger bar rod 30 fits with a smooth running fit in its housing 31 and its back end 36 has a long bearing of reduced diameter in base 33 whereby the danger of the parts jamming or binding if struck a slanting blow is avoided. Washer 38 is held on the rod 30 by cotter pin 138 which prevents the spring 32 from pushing it out of its housing.

The trigger 35 is fastened to and extends back from trigger bar K through a trigger guide shown as a loop 25 and terminates in a hook 34 in position to engage the handle loop 24 when the emergency fender is raised by hand and loop 24 is caught in hook 34 also by hand to reset the device.

I claim:

The combination with a vehicle having a frame and front wheels, of a substantially fixed fender having a trigger guide and comprising parallel horizontal bars carried by brackets extending forward from the frame of the vehicle; vertical closed top spring holders each carried by a bracket, each having a large and a small cylinder bore; emergency fender arms, each formed with a piston member vertically movable with a smooth running fit in the bore of a spring holder and which extends down therefrom and then up below and behind the fixed fender; an emergency fender including horizontal bars carried by said arms below and behind the fixed fender, said bars extending outside of the front wheels and including a handle loop which extends up from the emergency fender behind the trigger guide; a compression housed in each spring holder adapted to be compressed when the emergency fender and arms are raised; trip mechanism including a trigger bar extending out in front of the fixed fender and carried by rods supported by and slidable in closed housings carried by the fixed fender, compression springs for said rods positioned in said housings, and a trigger extending back from the trigger bar through the trigger guide and ending in a hook which engages the emergency fender handle loop whereby when the trigger bar is struck, the trigger releases the emergency fender.

ALFRED BRICUGLIO.